United States Patent
Siomina et al.

(10) Patent No.: US 8,626,191 B2
(45) Date of Patent: Jan. 7, 2014

(54) NODE AND METHOD IN A NODE

(75) Inventors: Iana Siomina, Solna (SE); Yang Zhang, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/497,060

(22) PCT Filed: Mar. 6, 2012

(86) PCT No.: PCT/SE2012/050246
§ 371 (c)(1),
(2), (4) Date: Apr. 3, 2012

(87) PCT Pub. No.: WO2013/066233
PCT Pub. Date: May 10, 2013

(65) Prior Publication Data
US 2013/0237244 A1 Sep. 12, 2013

(51) Int. Cl.
*H04W 24/00* (2009.01)
(52) U.S. Cl.
USPC .......................................... 455/456.1; 455/410
(58) Field of Classification Search
USPC .................... 455/404.2, 456.1–457
See application file for complete search history.

(56) References Cited

U.S. PATENT DOCUMENTS

| 2003/0008668 A1* | 1/2003 | Perez-Breva et al. ......... 455/456 |
| 2003/0087647 A1* | 5/2003 | Hurst ............................ 455/456 |
| 2009/0253436 A1 | 10/2009 | Nientiedt |
| 2010/0309051 A1 | 12/2010 | Moshfeghi |

FOREIGN PATENT DOCUMENTS

WO WO2004023155 A1 3/2004

OTHER PUBLICATIONS

Lei Xie; Yuhao Wang; Xia Xue; "A New Indoor Localization Method Based on Inversion Propagation Model" WiCOM 2010 6th International Conference on, pp. 1-4, Sep. 23-23, 2010.
Widyawan; Klepal, M.; Pesch, D.; "Influence of Predicted and Measured Fingerprint on the Accuracy of RSSI-based Indoor Location Systems", Positioning, Navigation and Communication, 2007. WPNC '07. 4th Workshop on, pp. 145-151, Mar. 22, 2007.
International Search Report and Written Opinion with mailing date Mar. 27, 2013 issued by ISA/SE in corresponding PCT-application No. PCT/SE2012/050246.

* cited by examiner

*Primary Examiner* — Kashif Siddiqui

(57) ABSTRACT

Node and method in a node, for estimating a position of a user equipment. The method comprises determining the need for at least one virtual reference measurement. Further, the method comprises obtaining the at least one virtual reference measurement, when it is determined to be needed. Additionally, the method comprises estimating the position of the user equipment, using the obtained at least one virtual reference measurement.

32 Claims, 6 Drawing Sheets

NODE AND METHOD IN A NODE

RELATED APPLICATIONS

This application claims the benefit of U.S. Provisional Application No. 61/555,531, filed on Nov. 4, 2011. This application is also a National Stage application under 35 U.S.C. 371 of International Application No. PCT/SE2012/050246, filed on Mar. 6, 2012.

TECHNICAL FIELD

Implementations described herein relate generally to a node and a method in a node. In particular, a mechanism in a wireless network for estimating a position of a user equipment is described herein.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless communications capability. The user equipment units in the present context may be portable and enabled to communicate voice and/or data, via the radio access network, with another entity, such as a network node, for example.

The wireless communication system covers a geographical area which is divided into cell areas, with each cell area being served by a network node, radio node or base station e.g. a Radio Base Station (RBS), which in some networks may be referred to as "eNB", "eNodeB" or "NodeB", depending on the technology and terminology used. The network nodes may be of different classes such as e.g. macro eNodeB, home eNodeB or pico base station, typically based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within serving range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units.

The 3rd Generation Partnership Project (3GPP) has undertaken to evolve further the UTRAN and GSM based radio access network technologies, for example by developing Long Term Evolution (LTE) and the Evolved Universal Terrestrial Radio Access Network (E-UTRAN).

LTE is a technology for realizing high-speed packet-based communication that may reach high data rates both in the downlink and in the uplink. In LTE, network nodes, or base stations, which may be referred to as evolved-NodeBs, eNodeBs or even eNBs, may be connected to a gateway e.g. a radio access gateway, which in turn may be connected to one or more core networks.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

The possibility to determine the position of a mobile device, or user equipment as it also may be referred to as, has enabled application developers and wireless network operators to provide location based, and location aware, services. Examples of those are guiding systems, shopping assistance, friend finder, presence services, community and communication services and other information services giving the mobile user the information about their surroundings.

In addition to the commercial services, the governments in several countries have put requirements on the network operators to be able to determine, with a certain accuracy, the position of an emergency call. For instance, the governmental requirements in the USA (FCC E911) that it must be possible to determine the position of a certain percentage of all emergency calls with a certain accuracy. The requirements make no difference between indoor and outdoor environment.

Some positioning methods comprise Cell Identification (Cell ID or CID) and Enhanced-Cell ID (E-CID).

Cell ID positioning method comprises, given the cell ID of the serving cell, associating the position of the user equipment with the cell coverage area which may be described, for example, by a pre-stored polygon, where cell boundary is modelled by the set of non-intersecting polygon segments connecting all the corners.

E-CID comprises methods exploiting four sources of position information: the CID and the corresponding geographical description of the serving cell, the Round Trip Time (RTT) with respect to the serving cell, measured e.g. by means of Timing Advance (TA) and/or receive-transmit time difference measured at either user equipment and/or base station side, the CIDs and the corresponding signal measurements of the cells, up to 32 cells in LTE, comprising the serving cell, as well as Angle of Arrival (AoA) measurements.

Angle of arrival (AoA) positioning is a method for determining the direction of propagation of a radio-frequency wave incident on an antenna array. AoA determines the direction by measuring the Time Difference of Arrival (TDOA) at individual elements of the array—from these delays the AoA may be calculated.

The three most common E-CID techniques comprise: CID+RTT, CID+signal strength and AoA+RTT. The positioning result of CID+RTT is typically an ellipsoid arc describing the intersection between a polygon and circle corresponding to RTT. A typical result format of the signal-strength based E-CID positioning is a polygon since the signal strength is subject e.g. to fading effects and therefore often does not scale exactly with the distance. A typical result of AoA+RTT positioning is an ellipsoid arc which is an intersection of a sector limited by AoA measurements and a circle from the RTT-like measurements.

Inter-frequency measurements for E-CID are also possible, and inter-Radio Access Technologies (RAT) measurements have also been discussed. The measurements, such as intra-frequency, inter-frequency, and/or inter-RAT may comprise downlink measurements, uplink measurements, or two-directional measurements such as e.g., RTT, TA or Receiver-Transmitter (Rx-Tx).

A more promising approach may be provided by so-called fingerprinting positioning. Such methods may also be referred to as pattern matching. Fingerprinting positioning algorithms operate by creating a radio fingerprint for each point of a fine coordinate grid that covers the Radio Access Network (RAN). The fingerprint may e.g. comprise the cell IDs that are detected by the terminal, in each grid point; quantized path loss or signal strength measurements, with respect to multiple eNodeBs, performed by the terminal, in each grid point; quantized Timing Advance (TA), in each grid point; quantized AoA information.

Whenever a position request arrives to the positioning node, a radio fingerprint is first obtained (e.g., by requesting and then receiving corresponding measured), after which the corresponding grid point is looked up and reported. This of course requires that the point is unique.

Currently, there is no fingerprinting positioning technology standardized, being viewed as a positioning implementation. However, possible standardization of this group of methods is being discussed in 3GPP. Currently, such methods in LTE rely mainly on E-CID measurements, comprising downlink and/or uplink, intra-frequency, inter-frequency, and inter-RAT, though not limited to them, e.g., the use of Received Signal Time Difference (RSTD) measurements, originally used for Observed Time Difference of Arrival (OT-DOA) positioning has also been discussed.

The database of fingerprinted positions or reference positions may be generated in several ways. A first alternative would be to perform an extensive surveying operation that performs fingerprinting radio measurements repeatedly for all coordinate grid points of the RAN. The disadvantages of this approach comprises: the surveying required becomes substantial also for small cellular networks; the radio fingerprints are in some instants, e.g. signal strength and pathloss, sensitive to the orientation of the terminal, a fact that is particularly troublesome for handheld terminals. For fine grids, the accuracies of the fingerprinted positions therefore become highly uncertain. This is unfortunately seldom reflected in the accuracy of the reported geographical result.

Another approach, applied e.g. in Adaptive Enhanced Cell IDentity positioning (AECID), is to replace the fine grid by high precision position measurements of opportunity, and to provide fingerprinting radio measurements for said points. This avoids the above drawbacks, however: algorithms for clustering of high precision position measurements of opportunity needs to be defined and/or algorithms for computation of geographical descriptions of the clusters need to be defined.

The above two problems may be solved by automatically collecting high-precision positions.

Yet another approach is the Observed Time Difference of Arrival (OTDOA) positioning method, which makes use of the measured timing of downlink signals received from multiple radio nodes at the user equipment. With OTDOA, the user equipment measures the timing differences for downlink reference signals received from multiple distinct locations. For each (measured) neighbour cell, the user equipment measures Reference Signal Time Difference (RSTD) which is the relative timing difference between neighbour cell and the reference cell. The user equipment position estimate is then found as the intersection of hyperbolas corresponding to the measured RSTDs. At least three measurements from geographically dispersed base stations with a good geometry are needed to solve for two coordinates of the user equipment and the receiver clock bias. In order to solve for position, precise knowledge of the transmitter locations and transmit timing offset is needed.

To enable positioning in LTE and facilitate positioning measurements of a proper quality and for a sufficient number of distinct locations, new physical signals for positioning have been introduced, i.e. Positioning Reference Signals (PRS), and low-interference positioning subframes have been specified in 3GPP, although OTDOA is not limited to using PRS only and may be performed on other signals as well e.g. Cell-specific Reference Signals (CRS).

Another positioning method is Uplink Time Difference of Arrival (UTDOA). In UTDOA, the uplink positioning makes use of the signals transmitted from the user equipment, wherein the timing of uplink signals are measured at multiple locations by radio nodes, e.g., by Location Measurement Units (LMUs) or eNodeBs (in LTE). The radio node measures the timing of the received signals using assistance data received from the positioning node, and the resulting measurements are used to estimate the location of the user equipment. Position calculation is similar to that with OTDOA.

Another positioning method comprises Global Navigation Satellite System (GNSS) and/or Assisted GNSS (A-GNSS). GNSS is a generic name for satellite-based positioning systems with global coverage. Examples of GNSS systems comprise the American Global Positioning System (GPS), the European Galileo, the Russian Glonass, and the Chinese Compass. GNSS positioning requires GNSS-capable receivers. With A-GNSS, the receivers receive the assistance data from the network. The positioning calculation is based on multi-lateration with Time of Arrival (TOA)-like measurements.

Hybrid positioning is yet another positioning technique that combines measurements and/or positions used by different positioning methods, such as e.g., E-CID measurements or fingerprinting-like approaches, which may also be used for hybrid positioning.

Adaptive Enhanced Cell Identity (AECID) is one kind of fingerprinting positioning technology that refines the basic cell identity positioning method in a variety of ways. The AECID positioning method is based on the idea that high precision positioning measurements, e.g. A-GPS measurements, may be seen as points that belong to regions where certain cellular radio propagation condition persist, i.e., each point may be characterised by a set comprised of cell identity and measurements characterising the environments.

Next, AECID method is described in more detail, by steps 1-4.

Step 1: A-GPS positioning is performed at the same time, and/or within a limited time interval, while the user equipment and/or network perform measurements. The AECID positioning method introduces tagging of high precision measurements according to certain criteria, e.g. comprising:

The cell identities that are detected by the user equipment, in each grid point;

The quantized path loss or signal strength measurements, with respect to multiple radio base stations, performed by the user equipment, in each grid point;

The quantized Round Trip Time (RTT, in WCDMA) or Timing Advance (TA, in GSM and LTE), or UE Rx-Tx time difference (in LTE) in each grid point;

The quantized noise rise, representing the load of a CDMA system, in each grid point;

The quantized signal quality e.g. RxQual in GSM, Ec/N0 in WCDMA and Reference Signal Receive Quality (RSRQ) in LTE;

Radio connection information like the Radio Access Bearer (RAB);

Quantized time.

It may be noted that the tag comprises a vector of indices, each index taking an enumerable number of discrete values. Continuous variables used for tagging, like path loss, hence need to be quantized.

Step 2: collect all high precision positioning measurements that have the same tag in separate high precision measurement clusters, and perform further processing of said cluster in order to refine it. Geographical region may be smaller than the cell coverage area in the cellular system.

Step 3: A polygon that represents the geographical extension of a cluster is computed, for each stored high precision position measurement cluster. The two most pronounced properties of the algorithm comprise: the area of the polygon is minimized, hence accuracy is maximized, for a given confidence level, and/or the probability that the user equipment is within the polygon, the confidence is precisely known. It is set as a constraint in the algorithm.

Step 4: For an incoming positioning request, the measurement of the user equipment, or the network node is firstly obtained. By looking up cell identities or tags, the polygon corresponding to the determined tag is then looked up in the tagged database of polygons, followed by a reporting, e.g. over Radio Access Network Application Part (RANAP), in UMTS, using the polygon format.

The Architecture and Protocols in LTE will now be discussed. The three key network elements in an LTE positioning architecture are the Location Service (LCS) Client, the LCS target and the LCS Server. The LCS Server is a physical or logical entity managing positioning for a LCS target device by collecting measurements and other location information, assisting the user equipment in measurements when necessary, and estimating the LCS target location. A LCS Client is a software and/or hardware entity that interacts with a LCS Server for the purpose of obtaining location information for one or more LCS targets, i.e. the entities being positioned. LCS Clients may reside in a network node, external node, user equipment, radio base station, etc., and they may also reside in the LCS targets themselves. An LCS Client sends a request to LCS Server to obtain location information, and LCS Server processes and serves the received requests and sends the positioning result and optionally a velocity estimate to the LCS Client. A positioning request may be originated from the user equipment or the network.

Position calculation may be conducted, for example, by a positioning server, such as e.g. E-SMLC or SLP in LTE, or user equipment. The former approach corresponds to either the user equipment assisted positioning mode or network-based positioning, whilst the latter corresponds to the user equipment based positioning mode.

Two positioning protocols operating via the radio network exist in LTE, LTE Positioning Protocol (LPP) and LTE Positioning Protocol-Annex (LPPa). The LPP is a point-to-point protocol between a LCS Server and a LCS target device, used in order to position the target device. LPP may be used both in the user plane and in the control plane, and multiple LPP procedures are allowed in series and/or in parallel thereby reducing latency. LPPa is a protocol between eNodeB and LCS Server specified only for control-plane positioning procedures, although it still may assist user-plane positioning by querying eNodeBs for information and eNodeB measurements. Secure User Plane Location (SUPL) protocol is used as a transport for LPP in the user plane. LPP has also a possibility to convey LPP extension messages inside LPP messages, e.g. currently Open Mobile Alliance (OMA) LPP extensions (LPPe) are being specified to allow e.g. for operator-specific assistance data or assistance data that cannot be provided with LPP or to support other position reporting formats or new positioning methods.

A high-level architecture, as it is currently standardized in LTE, is illustrated in FIG. 1A, where the LCS target is a user equipment, and the LCS Server may comprise an Evolved Serving Mobile Location Centre (E-SMLC) and/or a Service Location Protocol (SLP). In FIG. 1A, the control plane positioning protocols with E-SMLC as the terminating point, and the user plane positioning protocol are schematically shown. In an example implementation, SLP has a proprietary interface with E-SMLC.

As a core network node, logical connections between E-SMLC and Mobile Management Entity (MME) may be made as illustrated in FIG. 1A. E-SMLC may connect to more than one MME and to more than one MME pool.

Uplink positioning architecture may comprise also uplink measurement units such as e.g., Location Measurement Units (LMUs), which may be e.g. logical and/or physical nodes, may be integrated with radio base stations or sharing some of the software or hardware equipment with radio base stations or may be completely standalone nodes with own equipment, including antennas. The architecture may comprise communication protocols between LMUs and the positioning node, some enhancements for LPPa or similar protocols to support uplink positioning.

FIG. 1B illustrates an uplink positioning architecture in LTE, according to prior art.

A new interface, SLm, between the Evolved Serving Mobile Location Centre (E-SMLC), which also may be referred to as a positioning server, or positioning node; and Location Measurement Unit (LMU) is being standardized for uplink positioning. The interface is terminated between a positioning server (i.e. E-SMLC) and LMU. It is used to transport LMUP protocol (new protocol being specified for uplink positioning) messages over the E-SMLC-to-LMU interface. Several LMU deployment options are possible. For example, an LMU may be a standalone physical node, it may be integrated into eNodeB or it may be sharing at least some equipment such as antennas with eNodeB—these three options are illustrated in the FIG. 1B.

The LCS Client is defined as a software and/or hardware entity that interacts with a LCS Server for the purpose of obtaining location information for one or more user equipments. LCS Clients subscribe to a location service in order to obtain location information. LCS Clients may or may not interact with human users. The LCS Client is responsible for formatting and presenting data and managing the user interface (dialogue). The LCS Client may reside in the user equipment or in a Secure User Plane Location (SUPL)-Enabled Terminal (SET), but it may also be at the network side, such as e.g. Public Safety Answering Point (PSAP), a node with network maintenance services, base stations, etc. LCS Client Type is sent in request for positioning estimates to assist a Serving Mobile Location Centre (SMLC) to appropriately prioritize the location request.

The Client Type information is very important in practice since it allows for configuring LCS QoS discrimination in a flexible way. Also, there may exist some restrictions for certain LCS client types.

E.g. in UTRAN, the LCS Client type is signalled in the location reporting control message as one of eight pre-defined values in UTRAN, said values being used to discriminate between different services. The following Client Type values are supported by UTRAN Iu interface: Emergency Services, Value Added Services, Public Land Mobile Network (PLMN) Operator Services, Lawful Intercept Services, PLMN Operator Broadcast Services, PLMN Operator Operation and Maintenance Services, PLMN Operator Anonymous Statistics Services, PLMN Operator Target MS Services Support.

It may be noted that there is only one Client Type for commercial Location-Based Service (LBS), i.e. Value Added Services and there is only one Client Type for emergency services. The same set of Client Types is used in LTE.

Service Type is an attribute of specific LBS that may be provided by the LCS client. The LCS Client may also provide the service identity, which may then be mapped by the server to a certain Service Type which may also be verified against the LCS profile and the subscription. The following LCS categories and types have been standardized: Public Safety Services (Emergency Services, Emergency Alert Services), Location Sensitive Charging, Tracking Services (Person Tracking, Fleet Management, Asset Management), Traffic Monitoring (Traffic Congestion Reporting), Enhanced Call Routing (Roadside Assistance, Routing to Nearest Commercial Enterprise), Location Based Information Services (Traffic and public transportation information, City Sightseeing, Localized Advertising, Mobile Yellow Pages, Weather, Asset and Service Finding), Entertainment and Community Services (Gaming, Find Your Friend, Dating, Chatting, Route Finding, Where-am-I), Service Provider Specific Services.

The same set of Service Type (a.k.a. Service Classes) is used in UTRAN and E-UTRAN (LTE).

A positioning result is a result of processing of obtained measurements, including Cell IDs, power levels, received signal strengths, etc., and it may be exchanged among nodes in one of the pre-defined formats. The signalled positioning result is represented in a pre-defined format corresponding to one of the seven Geographical Area Description (GAD) shapes.

Currently, the positioning result may be signalled, in at least one direction, between: LCS target and LCS server, e.g. over LPP protocol, between positioning servers, such as e.g., E-SMLC and Service Location Protocol (SLP), over standardized or proprietary interfaces; between positioning server and other network nodes such as e.g., E-SMLC and any of a Mobility Management Entity (MME); a Mobile Switching Centre (MSC); a Gateway Mobile Location Centre (GMLC); Operations & Maintenance (O&M); a Self-Organizing Network (SON) node; a Mobile Data Terminal (MDT); and/or between the positioning node and LCS Client, e.g., between E-SMLC and PSAP or between SLP and External LCS Client; or between E-SMLC and user equipment. In emergency positioning, LCS Client may reside in PSAPs.

Problems in the prior art solutions comprises difficulties to collect measurements and thus generate reference positions in areas which are not very populated, including rural areas, forests, mountains, off-road areas. Another problem is that insufficient geographical coverage of reference positions is provided in some scenarios, e.g., it takes time to populate the database for areas which are not very populated.

Emergency positioning is particularly important in such less populated areas since it is more difficult to get help in such areas and it may be more difficult to provide a rough description of the location to an emergency operator.

AECID methods are currently not designed to provide positions for low-populated areas or areas with insufficient reference position or reference measurement coverage.

There is no possibility with the current positioning signalling, architecture and positioning node implementation to choose whether unpopulated areas are taken into account or not, neither it is possible to deliver both results and distinguish among them.

SUMMARY

It is therefore an object to obviate at least some of the above mentioned disadvantages and to improve the performance in a wireless communication system.

According to a first aspect, the object is achieved by a method in a node. The method aims at estimating a position of a user equipment. The method comprises determining the need for at least one virtual reference measurement. Also, the method comprises obtaining the at least one virtual reference measurement, when it is determined to be needed. In addition, the method comprises estimating the position of the user equipment, using the obtained at least one virtual reference measurement.

According to a second aspect, the object is achieved by a node. The node aims at estimating a position of a user equipment. The node comprises a processor, configured to determine the need for at least one virtual reference measurement. The processor is also configured to obtain the at least one virtual reference measurement, when it is determined to be needed. In further addition, the processor is also configured to estimate the position of the user equipment using the obtained at least one virtual reference measurement.

Thanks to embodiments disclosed herein, it is possible to deal with areas where reference measurements are not sufficient, such as for example forests, deserts or other non-inhabited areas. Further, better positioning service adaptivity to environments and service types is provided according to some embodiments. Improved positioning is provided according to some embodiments as virtual measurements and real measurements are combined to obtain a location estimate. Thus is an improved performance within the wireless communication system is achieved.

Other objects, advantages and novel features will become apparent from the following detailed description of the present methods and nodes.

BRIEF DESCRIPTION OF THE DRAWINGS

The methods and nodes are described in more detail with reference to attached drawings illustrating examples of embodiments in which.

DETAILED DESCRIPTION

Embodiments herein are defined as nodes and methods in nodes, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
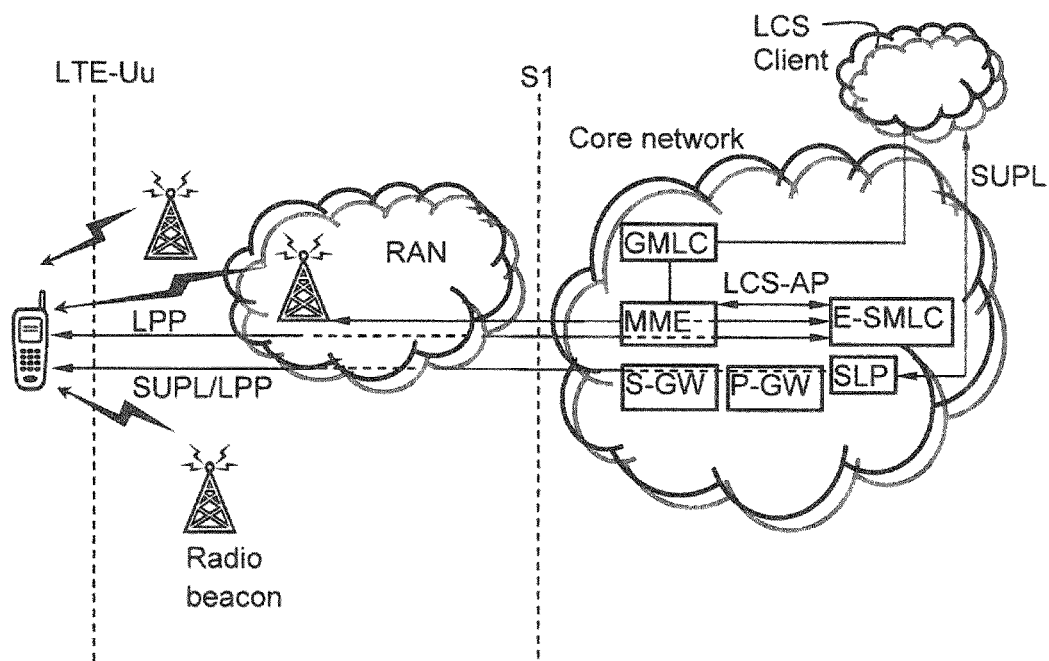
FIG. 1A is a schematic block diagram illustrating an architecture for positioning in a wireless communication system according to prior art.
Figure 1B:
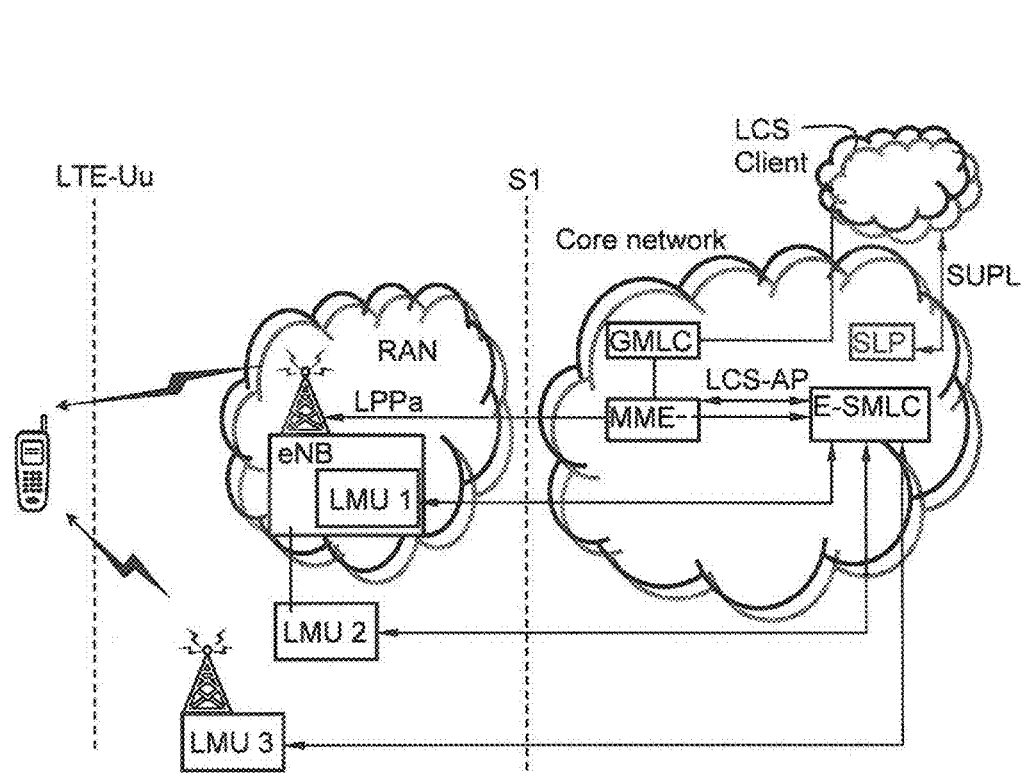
FIG. 1B is a schematic block diagram illustrating an architecture for positioning in a wireless communication system according to prior art.
Figure 2:
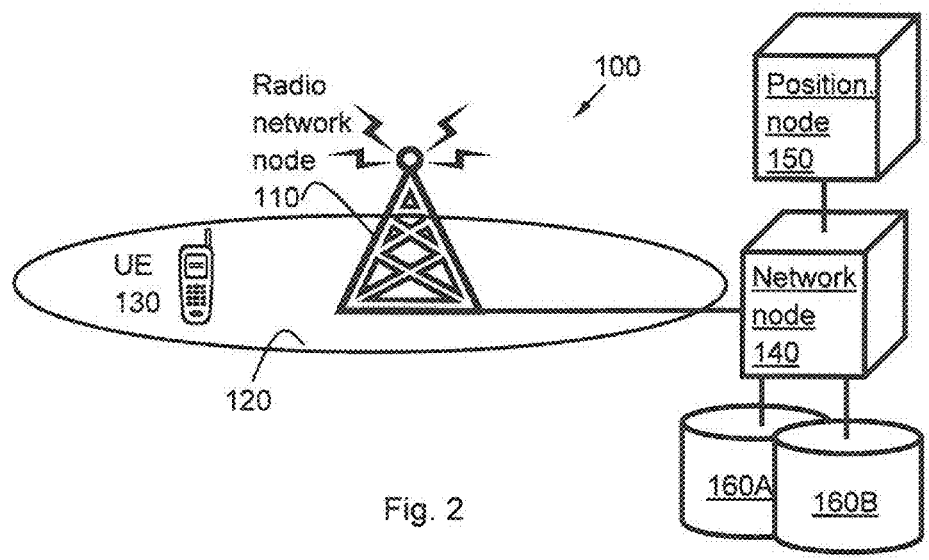
FIG. 2 is a schematic block diagram illustrating an example of a wireless communication system.

FIG. 2 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The wireless communication system 100 may further be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 2 is to provide a simplified general overview of the methods and network nodes herein described, and the functionalities involved. The methods and network nodes will subsequently, as a non-limiting example, be described in a 3GPP/LTE environment, but the embodiments of the disclosed methods may operate in a wireless communication system 100 based on another access technology.

The wireless communication system 100 comprises at least one node 110, which is a radio network node serving a cell 120, in which a user equipment 130, served by the node 110. The node 110, represented by a radio network node is connected to a network node 140, to a positioning node 150, and/or to data bases 160A and 160B. The node 110 may communicate with the network node 140, with a positioning node 150, and/or with data bases 160A and 160B either over a backhaul link, or via an X2 or S2 communication interface.

The user equipment 130 is configured to transmit radio signals comprising information to be received by the serving node 110. Further, the user equipment 130 is configured to receive radio signals comprising information transmitted by the node 110. The communication between the node 110, and the user equipment 130 may thus be made wirelessly.

It is to be noted that the illustrated network setting of node 110, user equipment 130, network node 140, positioning node 150 and/or data bases 160A/160B in FIG. 2 is to be regarded as a non-limiting embodiment only. The wireless communication network 100 may comprise any other number and/or combination of nodes 110, 130, 140, 150, and/or data bases 160A/160B, although only one instance of each of them (two data bases 160A/160B), respectively, are illustrated in FIG. 2 for clarity reasons. A plurality of nodes 110, 130, 140, 150, and/or data bases 160A/160B may further be involved in the present methods according to some embodiments.

Thus whenever "one" or "a/an" node 110, user equipment 130, network node 140, positioning node 150, and/or data base 160A/160B, a plurality of nodes 110, user equipments 130, network nodes 140, positioning nodes 150, and/or data bases 160A/160B may be involved, according to some embodiments.

The node 110 may according to some embodiments be referred to as e.g. radio network node, network node, base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device or any other network node configured for communication with the user equipment 130 over a wireless interface, depending e.g. of the radio access technology and terminology used.

In the subsequent part of the disclosure, in order to not unnecessarily complicate the explanation, the methods and structural elements comprised in the scenario depicted in FIG. 2 will be described, wherein the term "node" will be used for the radio network node 110, in order to facilitate the comprehension of the present methods.

The user equipment 130 may be represented by e.g. a wireless communication terminal, a mobile cellular phone, a Personal Digital Assistant (PDA), a wireless platform, a mobile station, a portable communication device, a laptop, a computer, a computer tablet, a wireless terminal acting as a relay, a relay node, a mobile relay, a Customer Premises Equipment (CPE), a Fixed Wireless Access (FWA) nodes or any other kind of device configured to communicate wirelessly with the node 110.

The node 110 controls the radio resource management within the cell 120, such as e.g. allocating radio resources to the user equipment units 130 within the cell 120 and ensuring reliable wireless communication link between the node 110 and the user equipment 130. The node 110 may comprise an eNodeB, e.g. in an LTE-related wireless communication system 100.

Embodiments of the herein disclosed methods comprise inclusion of unpopulated areas, or areas with insufficient measurement availability, in positioning. According to some of the example embodiments focus primarily on positioning, particularly on the positioning methods utilising reference measurements for estimating a location, such as fingerprinting methods, pattern matching methods, AECID, iAECID, hybrid positioning, E-CID positioning, etc.

Limited data availability may cause severe problem for fingerprinting-like positioning methods. Such methods in prior art require as many as possible radio measurement and ground truth pairs to be used as reference samples. The limitations which are intended to be eliminated, at least to some extent comprises improving positioning in areas which are hard to access, for example road less areas, forests etc. Further, the cost of data collection is high and time consuming. Driving test is a popular approach for data collection however it is with low efficiency. And new round of driving test is required if there is cell replanning or altering, e.g. because new radio nodes are deployed, which happens from time to time in most networks. Operating Expenditures (OPEX) may be very high for maintaining an up-to date fingerprinting sample databases 160A/B. Additionally, data collection routes cannot well reflect the real location distribution of positioning service. For example, an emergency may not always happen on the road or the crowded streets. Therefore the position estimate based on the collected data is with a lower confidence than if it were based on measurements with full coverage of the area, i.e. without non-populated areas, which is a disadvantage. In further addition, data collection takes time and may also be performed in the life network, e.g., with AECID, whilst the network may still need to operate until measurement databases become mature and detailed enough.

One embodiment herein addressing the limitations above comprises to populate a measurement set with virtual measurements. Another embodiment comprises to ensure that the areas with insufficient available measurements are not excluded and taken into account in position calculation.

One of the approaches according to some embodiments described herein comprises solving the described problem of insufficient measurement availability by using virtual radio measurements. A virtual measurement may be created pro-actively or upon a request or upon identifying that the available measurements, e.g., of a certain type are insufficient. For example, the following events may trigger generating virtual measurements according to different embodiments: manual or a scheduled trigger, a request or an indication for such a need from another node 110, 130, 140, 150, the identified insufficiency of measurements, e.g., of available real measurements or available real and available virtual measurements, an update in the network or local area deployment, e.g., introducing a new node 110, 140, 150, virtual measurements may thus be generated for the new cell 120. Further, node reconfiguration may generate such virtual measurements. Virtual measurements may be generated for impacted cells and/or areas in some embodiments. Virtual measurements may be created e.g. for a real location, e.g., during positioning of a user equipment 130 in that location, or a virtual grid which may be regular or irregular and may comprise adding artificial points over the entire area or in a local area in different embodiments.

An example virtual measurement e.g., Reference Signal Received Power (RSRP) or Reference Signal Received Quality (RSRQ) may be generated by a propagation model together with cell data, where the cell data may comprise e.g. cell antenna location, antenna profile, downlink Tx power, minimum signal level allowed for access, frequency information, environmental description such as e.g. urban/rural/indoor/outdoor etc. The propagation model may be pre-defined, configured or dynamically adjusted or predicted e.g. to fit the available measurements using interpolation, prediction techniques and/or extrapolation techniques.

Measurement virtualization may take into account, e.g., as input parameters, many factors, comprising antenna position/bearing/profile change, base station power change, radio environment change, such approach therefore may avoid the data recollection due to cell replanning/altering and may thus be more convenient in practice.

Virtual measurements may be refined or replaced with true measurements when the true measurements for the same location or nearby, e.g., within a certain distance, become available in some embodiments.

Virtual measurements may be stored in a separate database 160A or may be stored in a database 160B together with true measurements, but marked e.g. with an indicator distinguishing them from the true measurements. Further, a position for which virtual measurements were used may also be distinguished from positions obtained without virtual measurements, e.g., the distinguishing may be implemented by means of an indicator indicating whether or not virtual measurements were used. In other embodiments, the indicators may be measurement type specific.

Virtual measurements may be created by the user equipment 130 or nodes 110, 140, 150 such as eNodeB 110, Minimization of Drive Tests (MDT) node, Self-Organizing Networks (SON) node, Operations & Maintenance (O&M) node, and/or positioning node 150 and may be exchanged, also with the associated information such as the indicator, via relevant interfaces between the nodes 110, 130, 140, 150 of the same type, such as e.g., two positioning nodes 150 or different types such as e.g., a positioning node 150 and a radio network node 110.

In practice, positioning based on real data collection may be more accurate than that based on virtual measurements. It may therefore be an advantage to determine a good balance between using real measurements and virtual measurements. Methods for determining such balance may be comprised according to some of the embodiments herein. Such methods may typically be implemented in a network node 110, 130, 140, 150, such as e.g., a positioning node 150.

Methods for detection of non-populated areas and using virtual measurements may comprise determining at least one characteristic of the available real measurements, of one or more types or reference positions, such as e.g., a distribution characteristic, density, uniformness, number of measurements/locations, etc. The at least one characteristic may be calculated pro-actively or on-demand, for the entire area or locally according to different embodiments. Embodiments may be based on the determined at least one characteristic and may comprise to decide whether at least one virtual measurement is needed, and if the need is determined, to generate and/or to use at least one virtual measurement. An example method, for deciding whether a virtual measurement is needed and whether it may be combined with a real measurement, is further detailed below in step 0-step 3.

Step 0

A quick check for density and distribution of all reference measurement in a cell 120 may be performed, e.g., for a given serving cell 120 since the serving cell ID for a user equipment 130 is normally available, to decide whether next steps are necessary and avoid unnecessary probability/correlation calculation in some cases.

Step 1

During a positioning session, upon receiving a real-time measurement from user equipment 130 or radio network node 110, correlation between this measurement and reference measurements in a database 160A/160B may be calculated. Based on the correlation results, probability P0 may be calculated; where P0 is e.g. the probability of that the user equipment 130 is within a certain neighbourhood of reference measurement. The probability may correspond to a confidence level and the certain neighbourhood may be pre-determined or may correspond to an uncertainty area in some embodiments.

Step 2

A decision may be based on the following example logic:
If P0<Threshold 1
Use virtual data to get the location estimate
Else if P0>Threshold 2
Use real data to get location estimate
Else, i.e. if P0 is in range [Threshold 1<P0<Threshold 2]
Use both virtual and real data to get location estimate which may be e.g. a weighted result End
Wherein: Threshold 2>Threshold 1 and wherein Threshold 1 and Threshold 2 may be specific for different locations e.g., different cells 120, environments, e.g., urban/rural or indoors/outdoors, measurement types, e.g., for timing and power-based measurements, such as e.g. RSRP or RSRQ, requested positioning QoS levels; Client types, e.g., emergency or non-emergency, service types, e.g., for different location services or different for positioning and non-positioning, such as related to Radio Resource Management (RRM) or network planning and optimization tasks.

Step 3

A confidence level of the final location estimate may be deduced, based on: P0, whether real and/or virtual measurement is used and/or the similarity between real time measurement and reference measurements, wherein the similarity may be represented by correlation results.

Some embodiments of methods discussed herein, primarily focuses on positioning. However, the embodiments described herein may also apply for other services and purposes than positioning, such as e.g., in relation to RRM or network planning and optimization, e.g., SON. Further, the measurement databases 160A/160B may be shared by nodes 110, 140, 150 with multiple purposes, e.g., between any two or more of: positioning node 150, SON node 140, MDT node 140 or O&M node 140.

Thus the methods described in the section above may be adopted in a straightforward way also for other purposes and/or in other nodes 110, 140, 150, e.g., in general in a node 110, 140, 150 using reference measurements or accessing or maintaining a database 160A/160B with reference measurements.

In the described methods for detecting non-populated areas, it has been assumed that the unpopulated areas, or areas with insufficient reference measurements, if identified, are to be accounted in the position estimation, which may not always be necessary and not always desirable. One of the reasons may be that the position estimate accounting for such areas may become less accurate or may be obtained with a lower confidence. Another reason may be that it may not be interesting for all services to account for such areas, but may be important e.g., for emergency services.

Methods of deciding on which approach is to be used, approach 1: no inclusion of unpopulated areas; or approach 2: inclusion of unpopulated areas. Embodiments described in this section may further be combined with previously described embodiments e.g. for positioning.

The decision may be made in a node 110, 130, 140, 150 such as e.g. a positioning node 150 or a network node 140 in general which may or may not be positioning node 150, e.g., a node requesting positioning 110, 130, SON node 140, O&M node 140, etc. Embodiments may comprise a prior positioning method selection, e.g., comprised in a positioning request. As a part of the positioning method selection, e.g., select between a fingerprinting method without the accounting for unpopulated areas and a positioning method with accounting for unpopulated areas. Further, embodiments may be made after selection of positioning methods such as e.g., a fingerprinting method. The decision may be made dynamically or may also be pre-defined or pre-configured according to different embodiments.

Approach 2 may be decided to be used e.g. upon explicit request or configuration, for a specific Client Type or Service Type such as e.g., emergency, any non-commercial service or a subset of commercial services, services not strongly related to public places such as shopping areas, etc.; for a specific environment e.g., outdoors; in the areas potentially covered or served by certain cells 120; during a specific time e.g., during night; when a specific event occurs, e.g., an accident or a natural disaster; when a characteristic associated with positioning quality, e.g., requested position accuracy or positioning result confidence level is below a threshold level.

In some embodiments, it may be decided to provide both positioning results, with and without accounting for unpopulated areas. The two results may be further compared and one of the results may be compared if the difference in a characteristic of the result, e.g., the position difference, the uncertainty difference or the confidence difference is below a certain threshold level. In another embodiment, both results may be provided/signalled to the requesting node 110, 130, 140, 150. As discussed in methods of inclusion of unpopulated areas section, there may also be an indication to distinguish the first result from the second result.

When multiple shape reporting is possible, then there may also be a pre-defined order, e.g., the result by Approach 1 is comprised first in the list and the result by Approach 2 is comprised after the first result. The inclusion of the result obtained by Approach 2 may be optional in some embodiments, in addition to the result by Approach 1.

It may also be up to the positioning node 150 which result, i.e., using Approach 1 or Approach 2, to be comprised in the positioning report, e.g., to the node 110, 130, 140, 150 where Location Services Client (LSC) may reside such PSAP, eNodeB 110, user equipment 130, an external network client, etc., without or without indication.

Figure 3:
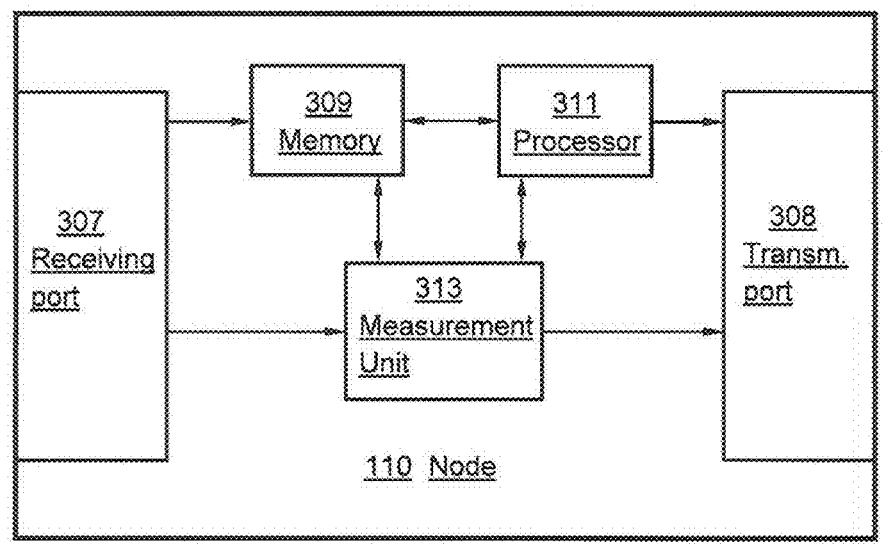
FIG. 3 is a schematic block diagram illustrating an example of an embodiment of a node in a wireless communication system.

FIG. 3 is an illustrative example of a node 110, 130, 140, 150 according to some of the example embodiments. The node 110, 130, 140, 150 illustrated in FIG. 3 may be an example of a user equipment 130, a base station 110, a positioning node 150, or any other network node 150 in the wireless communication system 100 that may employ the example embodiments presented herein.

The node 110, 130, 140, 150 may comprise any number of communication ports 307, 308, for example a receiving port 307 and a transmitting port 308. The communication ports 307, 308 may be configured to receive and transmit respectively, any form of communications data. It should be appreciated that the node 110, 130, 140, 150 may alternatively comprise a single transceiver port. It should further be appreciated that the communication or transceiver port 307, 308 may be in the form of any input/output communications port.

The node 110, 130, 140, 150 may further comprise at least one memory unit 309. The memory unit 309 may be configured to store received, transmitted, and/or measured data of any kind and/or executable program instructions. The memory 309 may comprise a physical device utilized to store data or programs i.e. sequences of instructions, on a temporary or permanent basis. The memory unit 309 be any suitable type of computer readable memory and may be of a volatile and/or non-volatile type.

The node 110, 130, 140, 150 may also comprise a measurement unit 313 that may be configured to perform, alter, or choose network related measurements of any kind. The node 110, 130, 140, 150 may further comprise a general processing unit 311.

The node 110, 130, 140, 150 is configured to estimate a position of a user equipment 130. The processor 311 comprised in the node 110, 130, 140, 150 may be configured to determine the need for at least one virtual reference measurement. Also, the processor 311 is configured to obtain the at least one virtual reference measurement, when it is determined to be needed. The processor 311 is also configured to estimate the position of the user equipment 130 using the obtained at least one virtual reference measurement.

The processor 311 may be further configured to obtain the at least one virtual reference measurement from: a separate database 160A with virtual reference measurements only, a database 160B with at least one real reference measurement, or from at least one of: a user equipment 130, a network node 140, and/or a radio network node 110, according to some alternative embodiments.

The processor 311 may further be configured to generate at least one virtual reference measurement in at least one of the following ways: upon a request, upon identifying that the available real reference measurements are insufficient, and upon a triggering event, according to some embodiments.

The processor 311 may further be configured to generate the at least one virtual measurement for a real location, or for a virtual grid.

Further, the processor 311 may further be configured to simulate or extrapolate a virtual reference measurement value related to a timing measurement, or a power-based measurement such as a received power measurement or a received quality measurement.

The processor 311 may in further addition configured to obtain a characteristic of real reference measurements related to the serving cell 120 of the user equipment 130, and also configured to determine the need for at least one virtual reference measurement based on obtained characteristic.

The processor 311 may further be configured to obtain a characteristic by establishing a density value and/or a distribution value of real reference measurements in some embodiments. Also, the processor 311 may further be configured to determine the need for at least one virtual reference measurement by comparing the established density value and/or distribution value with a first threshold value and determining to estimate the position of the user equipment 130 using a virtual reference measurement when the density value and/or distribution value does not exceed a first threshold value.

The receiving port 307 of the node 110, 130, 140, 150 may be configured to receive a measurement from the user equipment 130.

The processor 311 may further be configured to determine the need for at least one virtual reference measurement by calculating a correlation value, related to the correlation between the received measurement and a real reference measurement, computing a probability value, based on the calculated correlation value, which probability value indicates probability that the user equipment 130 is situated in a physical location, associated with the real reference measurement, comparing the computed probability value with a second threshold value, and determining to estimate the position of the user equipment 130 using the virtual reference measurement, when the computed probability value does not exceed the second threshold value.

The processor 311 may in addition be further configured to compare the computed probability value with a third threshold value, which is equal to, or bigger than the second threshold value, and also configured to determine to not use the virtual reference measurement, when the computed probability value exceeds a third threshold value in some embodiments.

The processor 311 may further be configured to determine to use both the real reference measurement and the virtual reference measurement, when the computed probability value exceeds the second threshold value, but does not exceed the third threshold value according to some embodiments.

The processor 311 may further be configured to estimate the position of the user equipment 130 by deducing a confidence level of the location estimate, based on: the computed probability value, whether real reference measurement and/or virtual reference measurement is used for estimating the position, and/or the similarity between the received measurement and the reference measurement, wherein the similarity may be represented by correlation results according to some embodiments.

Further, the second threshold value and/or the third threshold value may be configured based on: serving cell 120 of the user equipment 130, location, environment, measurement type, requested positioning quality of service level, client type, and/or service type.

The processor 311 may be further configured to generate the virtual reference measurement by simulation or extrapolation of reference measurement in a propagation model, based on cell data, where the cell data may comprise: cell antenna location, antenna profile, downlink transmission power, minimum signal level allowed for access, frequency information and/or environmental description.

In addition, the processor 311 may further be configured to determine the need for at least one virtual reference measurement, based on: explicit request, client type, service type, environment, cell 120, time, and/or a characteristic associated with positioning quality which does not exceed a fourth threshold value.

Furthermore, the processor 311 may additionally be further configured to estimate the position of the user equipment 130 using both a virtual reference measurement and a real reference measurement according to some embodiments.

It should be appreciated that the measurement unit 313 and/or the processing unit 311 may comprise e.g. one or more instances of e.g. a Central Processing Unit (CPU), a microprocessor, digital signal processor (DSP), field programmable gate array (FPGA), or Application Specific Integrated Circuit (ASIC) or other processing logic that may interpret and execute instructions. It should also be appreciated that the measurement unit 313 and/or the processing unit 311 need not be comprised as separate units. The measurement unit 313 and/or the processing unit 311 may be comprised as a single computational unit or any number of units. The processing unit 311 may further perform data processing functions for inputting, outputting, and processing of data comprising data buffering and device control functions, such as call processing control, user interface control, or the like.

One or more of the following advantages with the current embodiments may be envisioned. Enhanced fingerprinting methods, applicable for both user-plane and control-plane methods may be provided, with a possibility to deal with areas where reference measurements are not sufficient.

Further, better positioning service adaptivity may be achieved. Thereby, improved positioning service may be adapted to different environments and service types.

Thanks to embodiments described herein, both virtual data and real data may be combined to obtain location estimate.

Further, no impact is made on positioning areas where available reference measurements are sufficient, according to some embodiments.

In addition, embodiments herein provide enhanced signalling allowing to explicitly request for accounting unpopulated areas.

The user equipment 130 as described herein refers in a general sense to any of a wireless device or radio node equipped with a radio interface allowing for at least one of transmitting signals in uplink and receiving and/or measuring signals in downlink, or any wireless device or radio node being positioned.

Some examples of user equipment 130 that are to be understood in a general sense are PDA, laptop, mobile phone, sensor, fixed relay, mobile relay, a radio network node such as e.g., RBS, eNodeB, LMUs, mobile relays, fixed relay, femto BS, radio node using the terminal technology, sensor, user equipment 130 assisting other user equipment 130 or radio nodes in positioning, etc.

The signalling described in the example embodiments is either via direct links such as protocols or physical channels, or logical links such as e.g. via higher layer protocols and/or via one or more nodes 110, 140, 150. For example, in LTE in the case of signalling between E-SMLC and LCS Client the positioning result may be transferred via multiple nodes, at least via Mobility Management Entity (MME) and/or Gateway Mobile Location Centre (GMLC).

Positioning node 150 described in the different embodiments is a node with positioning functionality. For example, for LTE it may be understood as a positioning platform in the user plane (e.g., SUPL Location Platform (SLP) in LTE) or a positioning node in the control plane (e.g., E-SMLC in LTE). SLP may also comprise SLC and/or SPC, where SPC may also have a proprietary interface with E-SMLC. Positioning functionality may also be split among two or more nodes, e.g., there may be a gateway node between LMUs and E-SMLC, where the gateway node may be a radio base station 110 or another network node 140; in this case, the term "positioning node" may relate to E-SMLC and the gateway node. In a testing environment, a positioning node may be simulated or emulated by test equipment.

A cell 120 is associated with a radio network node 110, where a radio node 110 or radio network node 110 or eNodeB 110 used interchangeably in the description, comprises in a general sense any node 110 transmitting radio signals in downlink and/or receiving radio signals in uplink, e.g., eNodeB, macro/micro/pico base station, home eNodeB, relay, or repeater according to different embodiments. A radio network node 110 may or may not serve user equipment 130. Further, a radio network node 110 may or may not create own cells 120, e.g., may or may not have own cell IDs, according to different embodiments.

Some examples of radio network node 110 that do not serve user equipment 130 are beacon devices transmitting pre-defined signals, e.g., downlink reference signals such as Positioning Reference Signals (PRS) and Location Measurement Units (LMUs) performing measurements on uplink signals.

The example embodiments are not limited to LTE, but may apply in any Radio Access Network (RAN), single- or multi-Radio Access Technology (RAT). Some other RAT examples are LTE-Advanced, UMTS, HSPA, GSM, cdma2000, HRPD, WiMAX, and WiFi.

The example embodiments described herein may be considered as independent embodiments or may be considered in any combination with each other or with any parts of the other embodiments herein to describe non-limiting examples of the current methods.

Herein, the expressions "real measurements" or "reference measurements" are used interchangeably in the embodiments described herein, and may comprise any one or more of real measurements collected from user equipment 130 or radio network measurement reports that may be collected e.g. for positioning or any other purpose, e.g., MDT or SON; measurements obtained by drive tests; measurements obtained via network training; measurements obtained via simulations and used as reference measurements in the network e.g., for positioning or SON.

Reference measurement normally accompanies a ground truth, a.k.a. reference position, which is obtained at the time that measurement was made. The ground truth may be GPS or other high accuracy positioning result e.g. A-GPS, OTDOA, UTDOA etc. according to different embodiments.

The reference measurements may be stored in one or more databases 160A/160B in a node 110, 140, 150 and/or a user equipment 150, e.g., in the form of tables or maps.

At least in some embodiments, the term "unpopulated area" used herein may be interchangeably used with "area with insufficient reference measurements". The herein made description of the example embodiments, have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilise the example embodiments in various manners and with various modifications as are suited to the particular use contemplated. The features of the embodiments described herein may be combined in all possible combinations of methods, apparatus, modules, systems, and computer program products.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or Global Positioning System (GPS) receiver; a Personal Communications System (PCS) terminal that may combine a cellular radiotelephone with data processing; a Personal Digital Assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein is described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices including, but not limited to, Read Only Memory (ROM), Random Access Memory (RAM), Compact Discs (CDs), Digital Versatile Discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 4:
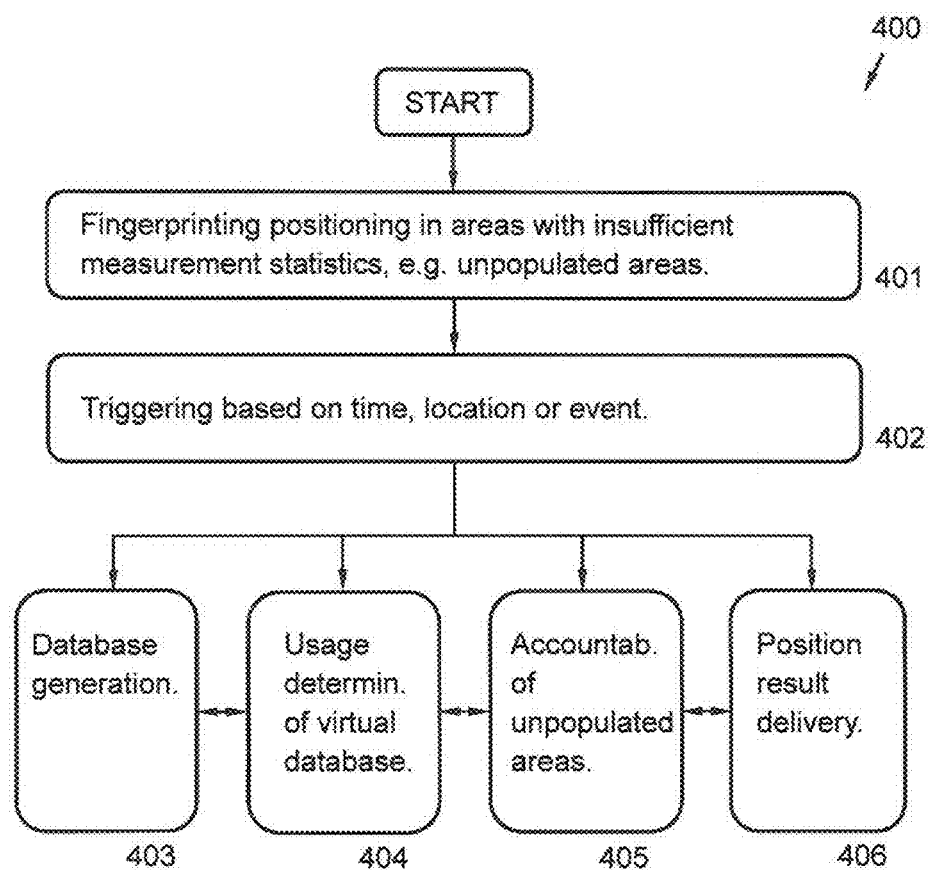
FIG. 4 is a schematic flow chart illustrating an embodiment of a method in a wireless communication system.
Figure 5:
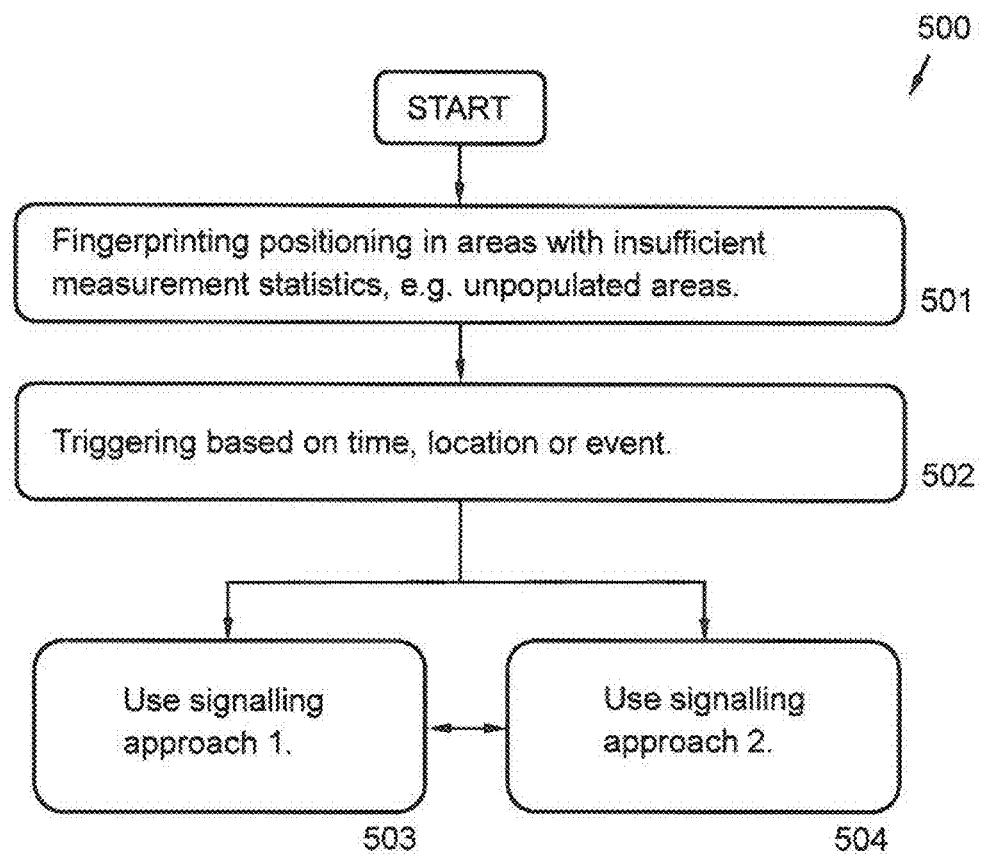
FIG. 5 is a schematic flow chart illustrating an embodiment of a method in a wireless communication system.

FIG. 4 is an illustration of an example of an embodiment of fingerprinting positioning in general in a node 110, 130, 140,

150. The fingerprinting positioning may comprise AECID methods, comprising iAECID, in particular, and the corresponding methods in a node 110, 130, 140, 150. FIG. 5 also comprises a method for triggering, generating, and using virtual reference measurements. Further, is provided a method for deciding whether to account or not for unpopulated areas. Also, a method of delivering the positioning result when it is possible to account for populated and/or unpopulated areas is provided.

According to the illustrated embodiment 400, fingerprinting positioning is made in areas with insufficient measurement statistics, e.g. unpopulated areas, in an action 401.

Thereafter, in an action 402 a triggering based on time, location or event is performed.

Embodiments of the method 400 may further comprise any, some or all of the actions database generation 403; usage determination of virtual database 404; accountability of unpopulated areas 405; and/or positioning result delivery 406.

FIG. 5 is an illustration of an example of an embodiment of a method 500, comprising new signalling means. In an action 501, fingerprinting positioning in areas with insufficient measurement statistics, e.g. unpopulated areas may be performed. Further, triggering based on time, location or event may be performed. Based on that, any of a first or a second approach may be utilised for signalling.

Figure 6:
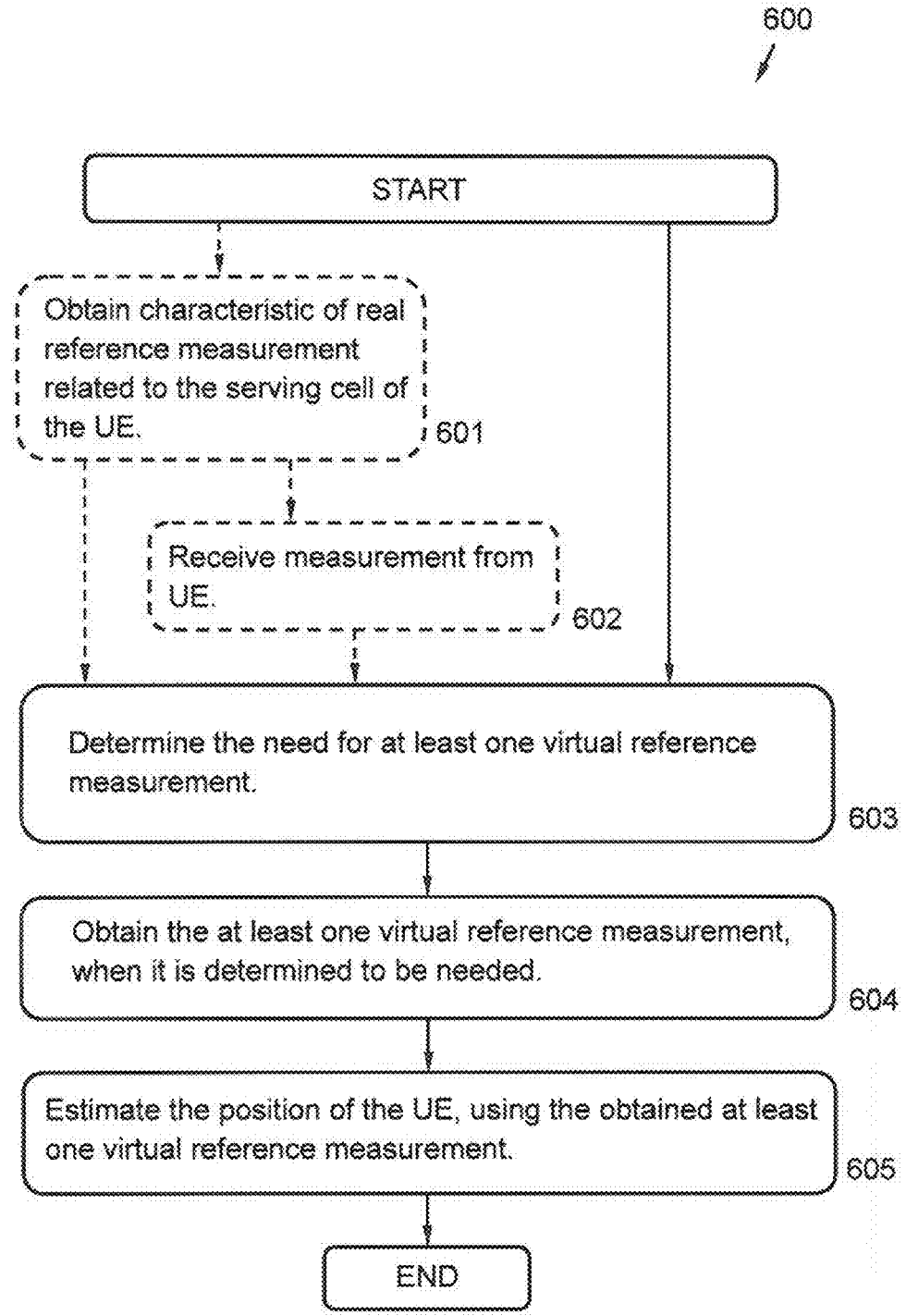
FIG. 6 is a schematic flow chart illustrating an embodiment of a method in a wireless communication system.

FIG. 6 is a flow chart illustrating embodiments of a method 600 in a node 110, 130, 140, 150 in a wireless communication system 100. The expression "method in a node" is in the present context to be interpreted as a "method to be performed in a node", or a "method for use in a node". The method 600 aims at estimating a position of a user equipment 130. The wireless communication system 100 may be based on Long-Term Evolution (LTE) within the Third Generation Partnership Project (3GPP) according to some embodiments. The node 110, 130, 140, 150 may comprise a radio network node 110 according to some embodiments, such as e.g. a base station such as e.g. an Evolved Node B. The node 110, 130, 140, 150 may further comprise a user equipment 130, a network node 140 or a positioning node 150, according to different embodiments.

To appropriately estimate a position of a user equipment 130, the method 600 may comprise a number of actions 601-605. It is however to be noted that any, some or all of the described actions 601-605, may be performed in a somewhat different chronological order than the enumeration indicates, or even be performed simultaneously. Also, it is to be noted that some of the actions such as e.g. 601 and/or 602 may be performed within some alternative embodiments. The method 600 may comprise the following actions:

Action 601

This action may be comprised within some, but not necessarily all alternative embodiments of the method 600.

A characteristic of real reference measurements related to the serving cell 120 of the user equipment 130 may be obtained. The real reference measurements may comprise e.g. any of signal fingerprinting, received power measurement (RSRP) or a received quality measurement (RSRQ), cell ID and/or E-CID; OTDOA; UTDOA; GNSS and/or A-GNSS; AECID.

A characteristic of real reference measurements related to the serving cell 120 of the user equipment 130 may comprise establishing a density value and/or a distribution value of real reference measurements, according to some embodiments.

Action 602

This action may be comprised within some, but not necessarily all alternative embodiments of the method 600.

A measurement may be received from the user equipment 130.

Action 603

The need for at least one virtual reference measurement is determined.

The virtual reference measurement may comprise a simulated or extrapolated value related to a timing measurement (comprising e.g. TA, RTT, Tx-Rx), or a power-based measurement such as a received power measurement (RSRP) or a received quality measurement (RSRQ).

The virtual reference measurement may be generated by simulation or extrapolation of reference measurement in a propagation model, based on cell data, where the cell data comprises: cell antenna location, antenna profile, downlink transmission power, minimum signal level allowed for access, frequency information and/or environmental description.

According to some alternative embodiments, the determination of the need above may be based on the obtained 601 characteristic of real reference measurements related to the serving cell 120 of the user equipment 130.

Further, according to some embodiments, the established density value and/or distribution value may be compared with a first threshold value. It may be determined to estimate the position of the user equipment 130 using a virtual reference measurement when the density value and/or distribution value does not exceed the first threshold value.

Further the determination may comprise calculating a correlation value, related to the correlation between the received 602 measurement and a real reference measurement, computing a probability value, based on the calculated correlation value, which probability value indicates probability that the user equipment 130 is situated in a physical location, associated with the real reference measurement, comparing the computed probability value with a second threshold value, and determining to estimate the position of the user equipment 130 using the virtual reference measurement, when the computed probability value does not exceed the second threshold value.

The computed probability value may be compared also with a third threshold value, according to some embodiments, which is equal to, or bigger than the second threshold value.

It may further be determined to not use the virtual reference measurement, when the computed probability value exceeds a third threshold value.

It may further, in some embodiments be determined to use both the real reference measurement and the virtual reference measurement, when the computed probability value exceeds the second threshold value, but does not exceed the third threshold value.

The second threshold value and/or the third threshold value may be configured based on serving cell 120 of the user equipment 130, location, environment, measurement type, requested positioning quality of service level, client type, and/or service type according to different embodiments.

The need for at least one virtual reference measurement may be determined based on: explicit request, client type, service type, environment, cell 120, time, and/or when a characteristic associated with positioning quality does not exceed a fourth threshold value, according to some embodiments.

Action 604

The at least one virtual reference measurement is obtained when it is determined 603 to be needed.

The at least one virtual reference measurement may be obtained, or achieved, or retrieved from: a separate database 160A with virtual reference measurements only, a database 160B with at least one real reference measurement, or from at least one of: a user equipment 130, a network node 140, and/or a radio network node 110.

Further, the at least one virtual reference measurement may be obtained by generating at least one virtual reference measurement in at least one of the following ways: upon a request, upon identifying that the available real reference measurements are insufficient, and/or upon a triggering event, according to different embodiments.

The at least one virtual measurement may be generated for a real location, or for a virtual grid, according to different embodiments.

The estimation of the position of the user equipment 130 may further comprise deducing a confidence level of the location estimate, based on: the computed probability value, whether real reference measurement and/or virtual reference measurement is used for estimating the position, and/or the similarity between the received 602 measurement and the reference measurement, wherein the similarity is represented by correlation results.

Action 605

The position of the user equipment 130 is estimated, using the obtained 604 at least one virtual reference measurement.

The position of the user equipment 130 may be estimated using both a virtual reference measurement and a real reference measurement.

The actions 601-605 to be performed in the node 110, 130, 140, 150 may be implemented through one or more processors 311 in the node 110, 130, 140, 150, together with computer program code for performing the functions of the present actions 601-605. Thus a computer program product, comprising instructions for performing the actions 601-605 in the node 110, 130, 140, 150 may estimate a position of a user equipment 130, when the computer program code is loaded into the one or more processors 311.

The computer program product mentioned above may be provided for instance in the form of a data carrier carrying computer program code for performing at least some of the actions 601-605 according to some embodiments when being loaded into the processor 311. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the node 110, 130, 140, 150 remotely, e.g. over an Internet or an intranet connection.

The invention claimed is:

1. A method in a node, for estimating a position of a user equipment, the method comprising:
   obtaining a characteristic of real reference measurements related to the serving cell of the user equipment,
   establishing a density value and/or a distribution value of real reference measurements,
   determining the need for at least one virtual reference measurement via a comparison of the established density value and/or distribution value with a first threshold value,
   obtaining the at least one virtual reference measurement, when it is determined to be needed,
   estimating the position of the user equipment, using the obtained at least one virtual reference measurement when the density value and/or distribution value does not exceed the first threshold value.

2. The method according to claim 1, wherein the action of obtaining comprises obtaining the at least one virtual reference measurement from: a separate database with virtual reference measurements only, a database with at least one real reference measurement, or from at least one of: a user equipment, a network node, and/or a radio network node.

3. The method according to claim 1, wherein the action of obtaining further comprises generating at least one virtual reference measurement in at least one of the following ways: upon a request, upon identifying that the available real reference measurements are insufficient, and upon a triggering event or condition.

4. The method according to claim 1, wherein the at least one virtual measurement is generated for a real location, or for a virtual grid.

5. The method according to claim 1, wherein the virtual reference measurement comprises a simulated or extrapolated value related to a timing measurement, or a power-based measurement such as a received power measurement or a received quality measurement.

6. The method according to claim 1, further comprising:
   receiving a measurement from the user equipment, and wherein the action of determining comprises:
   calculating a correlation value, related to the correlation between the received measurement and a real reference measurement,
   computing a probability value, based on the calculated correlation value, which probability value indicates probability that the user equipment is situated in a physical location associated with the real reference measurement,
   comparing the computed probability value with a second threshold value, and
   determining to estimate the position of the user equipment using the virtual reference measurement, when the computed probability value does not exceed the second threshold value.

7. The method according to claim 6, wherein the computed probability value is compared also with a third threshold value, which is equal to, or bigger than the second threshold value, and wherein it is determined to not use the virtual reference measurement, when the computed probability value exceeds the third threshold value.

8. The method according to claim 7, wherein it is determined to use both the real reference measurement and the virtual reference measurement, when the computed probability value exceeds the second threshold value, but does not exceed the third threshold value.

9. The method according to claim 1, wherein the action of estimating the position of the user equipment further comprises deducing a confidence level of the location estimate, based on: the computed probability value, whether real reference measurement and/or virtual reference measurement is used for estimating the position, and/or the similarity between the received measurement and the reference measurement, wherein the similarity is represented by correlation results.

10. The method according to claim 7, wherein the second threshold value and/or the third threshold value is/are configured based on serving cell of the user equipment, location, environment, measurement type, requested positioning quality of service level, client type, and/or service type.

11. The method according to claim 1, wherein the virtual reference measurement is generated by simulation or extrapolation of reference measurement in a propagation model, based on cell data, where the cell data comprises one or more of: cell antenna location, antenna profile, downlink transmission power, minimum signal level allowed for access, frequency information and/or environmental description.

12. The method according to claim 1, wherein the action of determining the need for at least one virtual reference measurement is based on: explicit request, client type, service type, environment, cell, time, and/or when a characteristic associated with positioning quality does not exceed a fourth threshold value.

13. The method according to claim 1, wherein the action of estimating the position of the user equipment is made using both a virtual reference measurement and a real reference measurement.

14. A node, configured to estimate a position of a user equipment, which node comprises:
a processor configured to obtain a characteristic of real reference measurements related to a serving cell of the user equipment by establishing a density value and/or a distribution value of real reference measurements,
the processor is further configured to determine the need for at least one virtual reference measurement based on the obtained characteristic via a comparison of the established density value and/or distribution value with a first threshold value,
the processor is further configured to obtain the at least one virtual reference measurement, when it is determined to be needed, and also configured to estimate the position of the user equipment using the obtained at least one virtual reference measurement when the density value and/or distribution value does not exceed the first threshold value.

15. The node, according to claim 14, wherein:
the processor is further configured to obtain the at least one virtual reference measurement from: a separate database with virtual reference measurements only, a database with at least one real reference measurement, or from at least one of: a user equipment, a network node, and/or a radio network node.

16. The node, according to claim 14, wherein:
the processor is further configured to generate at least one virtual reference measurement in at least one of the following ways: upon a request, upon identifying that the available real reference measurements are insufficient, and upon a triggering event.

17. The node, according to claim 14, wherein:
the processor is further configured to simulate or extrapolate a virtual reference measurement value related to a timing measurement, or a power-based measurement such as a received power measurement or a received quality measurement.

18. The node, according to claim 14, further comprising:
a receiving port, configured to receive a measurement from the user equipment, and wherein the processor is further configured to determine the need for at least one virtual reference measurement by calculating a correlation value, related to the correlation between the received measurement and a real reference measurement, computing a probability value, based on the calculated correlation value, which probability value indicates probability that the user equipment is situated in a physical location, associated with the real reference measurement, comparing the computed probability value with a second threshold value, and determining to estimate the position of the user equipment using the virtual reference measurement, when the computed probability value does not exceed the second threshold value.

19. The node, according to claim 18, wherein:
the processor is further configured to compare the computed probability value with a third threshold value, which is equal to, or bigger than the second threshold value, and also configured to determine to not use the virtual reference measurement, when the computed probability value exceeds the third threshold value.

20. The node, according to claim 19, wherein:
the processor is further configured to determine to use both the real reference measurement and the virtual reference measurement, when the computed probability value exceeds the second threshold value, but does not exceed the third threshold value.

21. The node, according to claim 14, wherein:
the processor is further configured to estimate the position of the user equipment by deducing a confidence level of the location estimate, based on: the computed probability value, whether real reference measurement and/or virtual reference measurement is used for estimating the position, and/or the similarity between the received measurement and the reference measurement, wherein the similarity is represented by correlation results.

22. The node, according to claim 19, wherein the second threshold value and/or the third threshold value is configured based on: serving cell of the user equipment, location, environment, measurement type, requested positioning quality of service level, client type, and/or service type.

23. The node, according to claim 14, wherein the processor is further configured to generate the virtual reference measurement by simulation or extrapolation of reference measurement in a propagation model, based on cell data, where the cell data comprises: cell antenna location, antenna profile, downlink transmission power, minimum signal level allowed for access, frequency information and/or environmental description.

24. The node, according to claim 14, wherein the processor is further configured to determine the need for at least one virtual reference measurement, based on: explicit request, client type, service type, environment, cell, time, and/or a characteristic associated with positioning quality which does not exceed a fourth threshold value.

25. The node, according to claim 14, wherein the processor is further configured to estimate the position of the user equipment using both a virtual reference measurement and a real reference measurement.

26. The node, according to claim 14, wherein the node comprises: a radio network node, a user equipment, a network node or a positioning node.

27. A method in a node for estimating a position of a user equipment, the method comprising:
receiving a measurement from the user equipment,
determining a need of a virtual reference measurement via a calculation of a correlation value, said correlation value related to a correlation between the received measurement and a real reference measurement,
computing a probability value, based on the calculated correlation value, which probability value indicates probability that the user equipment is situated in a physical location associated with the real reference measurement,
comparing the computed probability value with a first threshold value, and
determining to estimate the position of the user equipment using a virtual reference measurement, when the computed probability value does not exceed the first threshold value.

28. The method according to claim 27, wherein the computed probability value is compared also with a second threshold value, which is equal to, or bigger than the first threshold value, and wherein it is determined not to use the virtual reference measurement, when the computed probability value exceeds the second threshold value.

29. The method according to claim 28, wherein it is determined to use both the real reference measurement and the virtual reference measurement, when the computed probability value exceeds the first threshold value, but does not exceed the second threshold value.

30. A node configured to estimate a position of a user equipment, which node comprises:
   a receiving port configured to receive a measurement from the user equipment,
   a processor configured to determine a need for at least on virtual reference measurement via a calculation of a correlation value, related to a correlation between the received measurement and a real reference measurement,
   the processor further configured to compute a probability value, based on the calculated correlation value, said probability value indicating a probability that the user equipment is situated in a physical location associated with the real reference measurement,
   the processor further configured to compare the computed probability value with a first threshold value,
   the processor further configured to estimate the position of the user equipment using the virtual reference measurement when the computed probability value does not exceed the first threshold value.

31. The node according to claim 30, wherein the processor is further configured to compare the computed probability value with a second threshold value, which is equal to, or bigger than the second threshold value, and processor is also configured to determine to not use the virtual reference measurement when the computed probability value exceeds the second threshold value.

32. The node according to claim 31, wherein the processor is further configured to determine to use both the real reference measurement and the virtual reference measurement when the computed probability value exceeds the first threshold value but does not exceed the second threshold value.

* * * * *

UNITED STATES PATENT AND TRADEMARK OFFICE
CERTIFICATE OF CORRECTION

| | | |
|---|---|---|
| PATENT NO. | : 8,626,191 B2 | Page 1 of 1 |
| APPLICATION NO. | : 13/497060 | |
| DATED | : January 7, 2014 | |
| INVENTOR(S) | : Iana Siomina and Yang Zhang | |

It is certified that error appears in the above-identified patent and that said Letters Patent is hereby corrected as shown below:

On the Title Page, below Item (65) insert Provisional Application number --US 61/555,531, filed on November 4, 2011--.

Signed and Sealed this
Sixth Day of May, 2014

Michelle K. Lee
*Deputy Director of the United States Patent and Trademark Office*